March 9, 1965 S. R. HIRSCH 3,172,466

CLOSED LIQUID COOLING SYSTEM

Filed Aug. 29, 1962

INVENTOR.
SYLVAN R. HIRSCH

BY

Douglas R. McKechnie

ATTORNEY

United States Patent Office 3,172,466
Patented Mar. 9, 1965

3,172,466

CLOSED LIQUID COOLING SYSTEM

Sylvan R. Hirsch, West Orange, N.J., assignor, by mesne assignments, to Pall Corporation, a corporation of New York Filed Aug. 29, 1962, Ser. No. 220,171
3 Claims. (Cl. 165—108)

This invention relates to a closed liquid cooling system. While not limited thereto, the invention is particularly applicable to systems for cooling electronic equipment, such as high power electronic tubes, which are subject to premature failure if operated at higher than normal temperatures.

In liquid systems for cooling electronic tubes, the tubes can prematurely fail as a result of the heat transfer surfaces within the tube becoming coated, by sludge, scale, or other foreign material in the liquid, so that the rate of heat transfer across such surfaces is decreased.

Prior art systems have used water as the coolant and, in the winter, an anti-freeze, such as ethylene glycol, is added to the water. In such systems, when the coolant contacts the atmosphere, either because the system is open or because it is a leaky closed system, there is a progressive corrosion and oxidation of the pipe system and deterioration of the cooling which develops scale, sludge, and other break-down compounds that coat the heat transfer surfaces. When this happens, the tubes operate at temperatures higher than their design temperatures and thereby fail prematurely.

Thus, one of the objects of the invention is to overcome the above difficulties by providing a closed liquid cooling system that prevents contact between the circulating coolant and the atmosphere.

Another object is to provide a completely filled, closed, liquid cooling system with novel means to maintain the system filled, in spite of any leakage of coolant from the system, and yet permit the system to operate so that the temperature of the coolant can vary without damaging the system.

Still another object is to provide a closed liquid cooling system with a novel expansion tank having means for indicating the fill-level and the low-level of liquid in the system.

Another object is to provide a closed liquid cooling system having an expansion tank, with novel means for filling and charging the system.

Other objects and advantages of the invention will be apparent from the following description taken in connection with the accompanying drawing, wherein.

Figure 1:
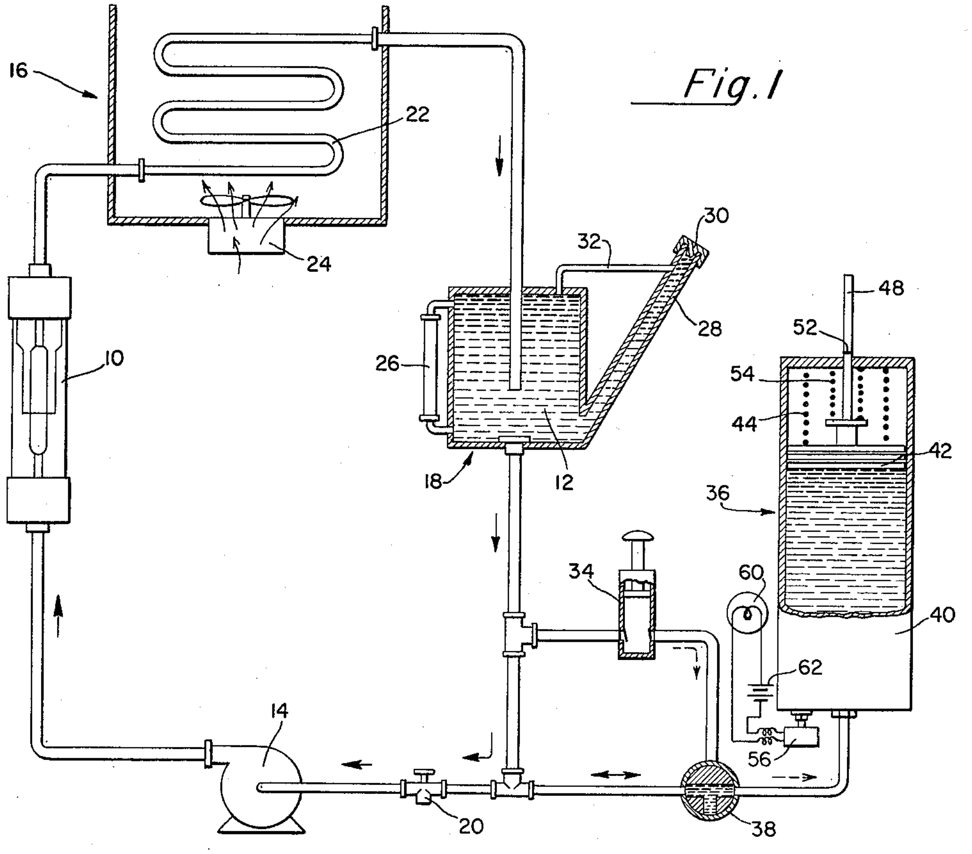
FIG. 1 is a schematic diagram of a cooling system embodying the invention.

Referring now to the drawing, there is shown a closed system for cooling a load 10 by a liquid coolant 12, the load being a portion of a primary coolant flow path comprising a circulating pump 14, a radiator 16 and a fill tank 18 connected in series by suitable pipes or conduits as shown in FIG. 1. A drain valve 20 can be connected in the system to permit drainage thereof.

Although the load is schematically shown as a mercury arc lamp, it is to be understood that the system can be used for other electronic loads such as high power klystron tubes and the like. It is also to be understood that the system could normally contain further refinements such as pressure relief valves, thermostatic controls, etc. Coolant 12 can be distilled water to which an anti-freeze can be added should such action be required.

When the system thus described is in operation, pump 14 circulates the coolant 12, causing it to flow around the primary flow path in the direction of the arrows in FIG. 1 so that the coolant flows from the pump, through load 10, through radiator coil 22 where the coolant is cooled by cooler air being driven over the coil by a fan 24, into the fill tank 18 and back to the pump 14.

Fill tank 18 comprises a gauge glass 26, a stand pipe 28 covered by a cap 30, and a vent line 32 that extends between the top of the tank and the upper end of stand pipe 28. This upper end is at a height above the top of the tank.

The cooling system also includes a fill pump 34, an expansion tank 36, and a three-way valve 38 that are connected, as illustrated in FIG. 1, in branches tapped off the primary flow path. Fill pump 34 is manually actuated and has its inlet connected to the primary flow path adjacent to the outlet of fill tank 18. The outlet of fill pump 34 is connected to one of the ports of valve 38. When valve 38 is set so that the outlet of pump 34 is connected to the expansion tank, actuation of pump 34 causes coolant to flow in the direction of the dotted arrows in FIG. 1 into the expansion tank.

Expansion tank 36 comprises a cylindrical casing 40 housing a vertically movable piston 42 which is biased by a squared and ground end compression spring 44 against the surface of the liquid within the tank to maintain the piston in contact with the liquid. The bottom of the expansion tank has a port 46, which acts as both an inlet and an outlet port depending upon the direction of coolant flow, that is connected, as illustrated, to another one of the ports of valve 38. Piston 42 divides the interior of the tank into two chambers, the upper one being vented by a vent port 45 and the lower one forming an expansible chamber communicating with port 46.

The system also includes means for indicating the fill-level and low-level of coolant 12. As illustrated, a fill-level indicator is provided which comprises a rod 48 having a circular base 50 at its lower end and a medial mark 52 of characteristic appearance such as coloration. The rod is supported by a squared and ground end helical compression spring 54 secured at its ends to the casing 40 and base 50. Rod 48 is located partially within the upper chamber of the expansion tank and is guided for axial movement by an axial hole in the top of the expansion tank.

Piston 42 has an upwardly extending, axial abutment 55 which, when the liquid in the expansion tank is above the predetermined level, abuts base 50 and thereby actuates the indicator in response to variations in the level of the coolant. When the level of the liquid in the expansion tank 36 is below a predetermined level, abutment 55 is spaced from base 50 whereby the indicator rod 48 is suspended by spring 54. Mark 52 is located so that it is normally within the expansion tank and hidden from view. But, when the level of the liquid in the tank is above a predetermined level, such as illustrated in FIG. 1, mark 52 is visible and provides an indication that the expansion tank contains a predetermined quantity of cooling liquid.

When the system is in operation, valve 38 is positioned as illustrated in FIG. 1 so that the expansion tank communicates with the primary flow path at a point between the outlet of fill tank 18 and the inlet of pump 14. Obviously, such connection places the expansion tank in communication with the low pressure side of the pump. Under such conditions, cooling liquid can flow into and out of tank 36, due to expansion and contraction of the cooling liquid as caused by temperature variations or by pressure surges. Furthermore, as the system operates, there is normally a small amount of coolant loss due to the cooling liquid leaking from the primary flow path. The leakage losses are made up from liquid within the expansion tank 36. Obviously, as the make-up fluid is added to the primary flow path from expansion tank 36, the volume of the expansible chamber decreases and piston 42, under the bias of spring 44, moves downwardly in the tank.

Figure 2:
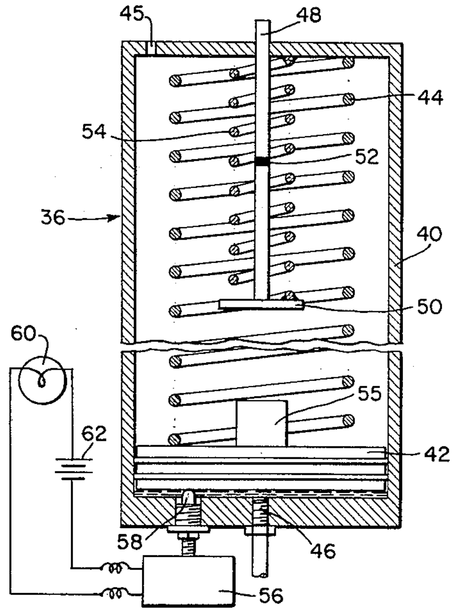
FIG. 2 is a somewhat schematic, vertical, sectional view of the expansion tank of FIG. 1, shown on an enlarged scale for clarity of illustration.

The low-level indicator comprises a single pole, single throw, normally open switch 56, having a sealed actuating button 58 that extends upwardly into the lower end of the expansible chamber. Button 58 is engageable with the bottom of piston 42, as illustrated in FIG. 2 and is operative, upon actuation thereof, to close the contacts of switch 56. The switch is in a circuit containing an indicating lamp 60 and a source of power 62 for illuminating the lamp. Thus, when switch 56 is closed, the lamp glows and thereby provides an indication that the level of liquid in tank 36 has decreased to a predetermined level. In other words, when lamp 60 is burning, it indicates that the volume of liquid within the expansible chamber is at a minimum volume and more coolant should be added to the system.

In order to refill the system, valve 38 is rotated 90° in a counterclockwise direction as viewed in FIG. 1, so that the outlet of pump 34 communicates with port 46 through valve 38. Next, cap 30 is removed. Then, pump 34 is actuated and draws coolant from fill tank 18 and pumps it into expansion tank 36. As the level of the liquid in the fill tank decreases, as seen through gauge glass 26, more coolant is added to the tank through stand pipe 28. The pumping operation continues until piston 42 is raised by the pressure of the liquid within the expansible chamber so that indicator rod 48 exposes mark 52. Then the pumping operation is stopped. Afterwards, more liquid is added to completely fill tank 18 and cap 30 is replaced. Finally, valve 38 is shifted so that the expansion tank communicates directly with the primary flow path as shown in FIG. 1.

In order to initially fill the system, fill tank 18 is first filled with coolant. Then pump 14 is started and draws liquid from the fill tank and forces it into the system. If the volume of liquid within fill tank 18 is insufficient to fill the primary flow path, more liquid is added to the tank until continued operation of pump 14 is ineffective to empty the tank. This can be seen by gauge glass 26. Thereafter, the expansion tank is filled in a manner similar to that described above until the system is completely filled.

While only a single embodiment has been illustrated, it will be apparent to those skilled in the art that many changes can be made in the details of construction and in arrangement of parts without departing from the scope of the invention as defined in the appended claims.

What is claimed is:

1. A closed liquid cooling system for cooling a load, comprising: means defining a primary flow path, a circulating pump in said flow path for pumping a liquid coolant through the load along the primary flow path; a fill tank; an expansion tank comprising an expansible chamber adapted to be filled by the liquid, a fill-level indicator for indicating the fill volume of said expansible chamber, and a low-level indicator for indicating a predetermined minimum volume of said expansible chamber; said expansible chamber comprising a cylinder, a piston slidably disposed in said cylinder and having one side acting against liquid in said cylinder and spring means biasing said piston against said liquid; a fill pump having its inlet connected to draw liquid from said fill tank; and a valve having a selectively operable valve member for connecting said expansible chamber alternately to the outlet of said fill pump and to said primary flow path adjacent to the inlet of said circulating pump.

2. A cooling system in accordance with claim 1 wherein said fill-level indicator comprises an indicating rod disposed on the other side of said piston, and spring means resiliently supporting said rod for sliding movement relative to said cylinder, said piston being engageable with said indicating rod for actuating it.

3. A cooling system in accordance with claim 1 wherein said low-level indicator comprises switch means having an actuating button engageable with said piston so that said switch is actuated by said piston when the piston has reached a predetermined position.

References Cited in the file of this patent

UNITED STATES PATENTS

| | | |
|---|---|---|
| 1,738,233 | Conill | Dec. 3, 1929 |
| 2,759,340 | Beslin | Aug. 21, 1956 |
| 2,914,924 | Murphy | Dec. 1, 1959 |